United States Patent Office 3,809,636
Patented May 7, 1974

3,809,636
DEVICE FOR MEASURING AN ACTIVITY OF SILVER IONS
Kenji Higashiyama and Hiroshi Hirata, Katano, Japan, assignors to Matsushita Electric Industrial Co., Ltd., Osaka, Japan
Filed Feb. 28, 1972, Ser. No. 229,812
Claims priority, application Japan, Mar. 2, 1971, 46/11,124, 46/11,125; Mar. 3, 1971, 46/11,408, 46/11,409
Int. Cl. G01n 27/46
U.S. Cl. 204—195 M                5 Claims

ABSTRACT OF THE DISCLOSURE

A device for measuring an activity of silver ions comprises a selective electrode and a reference electrode immersed in a solution containing silver ions, said selective electrode including a disc which comprises silver selenide or silver telluride or at least two members selected from the group consisting of silver sulfide, silver selenide and silver telluride.

BACKGROUND OF THE INVENTION

The invention relates to a device for measuring an activity of silver ions and more particularly to a device comprising a selective electrode responsive to the activity of silver ions and a reference electrode.

Silver ion activity can be determined by several methods such as chelatometric titration, spectrophotography and polarography. However, these methods generally require troublesome pretreatment for the sample before the measurement of silver ions.

It is desirable for chemical industry to have a device for measuring the activity of silver ions in a solution without any troublesome pretreatment similar to that of a pH glass electrode for measuring the pH value of a solution without any pretreatment of the solution to be tested.

An object of this invention is to provide a device for measuring directly the activity of silver ions in a solution.

A further object of this invention is to provide such a measuring device characterized by a high sensitivity to silver ions.

Another object of this invention is to provide a silver ion measuring device characterized by high response silver ions.

These and other objects of this invention will be apparent upon consideration of the following detailed description taken together with accompanying drawings.

A device for measuring an activity of silver ions according to the invention comprises a selective electrode and a reference electrode immersed in a solution containing silver ions, whereby only another surface contacts with said solution. Said silver ion-selective electrode includes a disc which comprises silver selenide or silver telluride or at least two members selected from the group consisting of silver sulfide, silver selenide and silver telluride.

Said composition according to the present invention achieves a silver ion-selective electrode having a high sensitivity and a wide application range with pH value in a solution to be tested.

Figure 1:
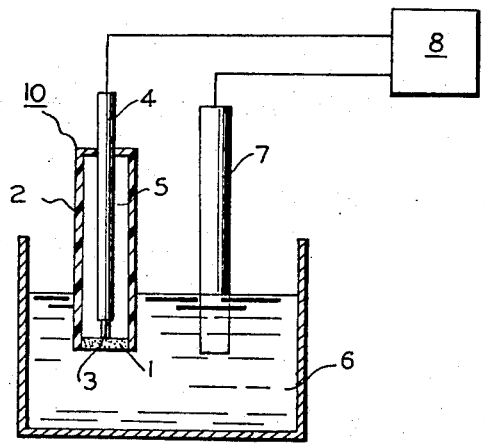
FIG. 1 is a schematic diagram of a device for measuring silver ions in a solution in accordance with the invention.

Referring to FIG. 1, reference character 10 designates, as a whole, a selective electrode which comprises a disc in a composition according to the present invention. Said lead 3 is enveloped by a sealed wire 4. A combination of said disc 1 and said lead 3 partly enveloped by said sealed wire 4 is enclosed in a housing 2 so that another surface of said disc 1 contacts with a solution 6. Said housing 2 is filled with an insulating resinous material 5. A reference electrode 7 partly immersed in said solution 6 is electrically connected to one terminal of a voltmeter 8 having a high impedance. Said lead 3 is electrically connected to another terminal of said voltmeter 8.

A variation in the logarithm of the activity of silver ions in said solution 6 has a substantailly linear relation to the variation in the potentail between said selective electrode 10 and said reference electrode 7, both being partly immersed in said solution 6. One can use any available and suitable electrode such as a saturated calomel electrode or silver-silver chloride electrode as said reference electrode 7.

Said disc 1 is in a batch composition consisting of silver selenide or silver telluride or at least two members selected from the group consisting of silver telluride, silver selenide and silver sulfide, in accordance with the invention.

A batch composition comprising silver selenide or silver telluride results in a higher sensitivity of resultant electrode than that of a conventional silver sulfide electrode.

A batch composition consisting essentially of 30 to 99 wt. percent of one member selected from the group consisting of silver selenide and silver telluride and 1 to 70 wt. percent of silver sulfide results in a high sensitivity and a short response time of resultant electrode.

A batch composition comprising a combination of 1 to 99 wt. percent of silver selenide and 1 to 99 wt. percent of silver telluride also results in a higher sensitivity of resultant electrode than that of a conventional silver sulfide one.

A batch composition referred to herein is defined as a composition of starting materials before heating.

A better result is obtained by using a batch composition consisting essentially of 1 to 30 wt. percent of silver selenide, 30 to 69 wt. percent of silver telluride and the remainder of silver sulfide. This batch composition results in a high sensitivity and a short response time of resultant electrode.

A more preferable batch composition comprises a combination consisting essentially of 10 to 30 wt. percent of silver sulfide and 70 to 90 wt. percent of silver telluride.

Figure 2:
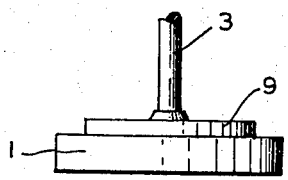
FIG. 2 is a cross sectional view of a disc for use in the device of FIG. 1.

A longer operation life can be obtained by providing said disc with a noble metal electrode such as gold, palladium or platinum electrode. Referring to FIG. 2, disc 1 has a noble metal electrode 9 applied to one surface thereof. A lead 3 is electrically connected to said noble metal electrode 9 by any available and suitable method such as soldering. Said noble metal electrode 9 can be prepared by, for example, vacuum-depositing of a noble metal film or by applying an available commercially noble metal paint.

The disc for use in said selective electrode can be obtained by heating a pressed body of a given composition in accordance with a conventional ceramic method.

Silver selenide or silver telluride of a fine powder form or a mixture of starting materials of a fine powder form in a given composition according to the present invention is pressed into a disc in a desired form at a pressure of 100 to 20,000 kg./cm.$^2$. The pressed disc is heated at a temperature of 100° to 600° C. for time period of 1 to 10 hours preferably in a non-oxidizing atmosphere, such as nitrogen or argon.

The device according to the invention can be reliably used at temperatures from 0° to 95° C. The measured potential versus the logarithm of the activity of silver ions is substantially linear relation.

Many kinds of diverse ions such as sodium, potassium, calcium, magnesium, nickel, cobalt aluminum, zinc, cadmium, lead, chloride, sulfate, nitrate and perchlorate ions are tolerated and may coexist during the measurement of the activity of silver ions. However, mercuric, ferric and sulfide ions should be removed from the solution to be measured.

Example 1

Silver selenide is pressed at a pressure of 10,000 kg./cm.$^2$ into a disc 15 mm. diameter and having a 3 mm. thickness. The pressed disc is heated at 300° C. for 2 hours in purified nitrogen gas stream having a flow rate of 0.2 l./min. The sintered disc is polished, at both surfaces, with silicon carbide abrasive and then with diamond paste into a thickness of 2 mm. The polished disc is provided, at one surface, with a gold electrode which is obtained from Du Pont gold paint #8115. The polished disc is connected, at the gold electrode, to a lead partly enveloped by a sealed wire and is mounted in a housing of polyvinyl chloride resin. The housing is filled with epoxy resin so as to build a selective electrode as shown in FIG. 1. A combination of the selective electrode and a saturated calomel electrode as a reference electrode is immersed in an aqueous solution of pure silver nitrate at 25° C. The potential between the selective electrode and the calomel electrode is measured by a voltmeter for use in a pH meter.

The device measures the activity of silver ions with a high sensitivity as shown in Table 1.

TABLE 1

| Activity of silver ions, M: | Potential, mv. |
|---|---|
| $10^{-1}$ | −7 |
| $10^{-2}$ | −62 |
| $10^{-3}$ | −117 |
| $10^{-4}$ | −176 |
| $10^{-5}$ | −235 |
| $10^{-6}$ | −294 |
| $10^{-7}$ | −353 |
| $10^{-8}$ | −412 |
| $10^{-9}$ | −457 |

Example 2

A device for measuring the activity of silver ions is prepared in a manner similar to that of Example 1. A disc of Example 2 includes silver telluride. The preparation of the disc is similar to that of Example 1. The potential between the selective electrode and a saturated calomel electrode in the aqueous solution of pure silver nitrate is measured with the same procedure described in Example 1. The device measures the activity of silver ions with a high sensitivity as shown in Table 2.

TABLE 2

| Activity of silver ions, M: | Potential, mv. |
|---|---|
| $10^{-1}$ | −32 |
| $10^{-2}$ | −88 |
| $10^{-3}$ | −141 |
| $10^{-4}$ | −200 |
| $10^{-5}$ | −259 |
| $10^{-6}$ | −318 |
| $10^{-7}$ | −377 |
| $10^{-8}$ | −436 |
| $10^{-9}$ | −484 |

Example 3

The device for measuring the activity of silver ions is prepared in a manner similar to that of Example 1. A disc of Example 3 includes 70 wt. percent of silver telluride and 30 wt. percent of silver sulfide. The preparation of the disc is similar to that of Example 1. The potential between the selective electrode and a saturated calomel electrode in an aqueous solution of pure silver nitrate is measured by the same procedure described in Example 1. The device measures the activity of silver ions with a high sensitivity and a high response as shown in Table 3.

TABLE 3

| Activity of silver ions, M | Potential, mv. | Response time, sec. |
|---|---|---|
| $10^{-1}$ | −46 | <3 |
| $10^{-2}$ | −103 | <3 |
| $10^{-3}$ | −162 | <3 |
| $10^{-4}$ | −221 | <3 |
| $10^{-5}$ | −280 | 3 |
| $10^{-6}$ | −339 | 10 |
| $10^{-7}$ | −398 | 25 |
| $10^{-8}$ | −452 | 50 |
| $10^{-9}$ | −483 | 130 |

Example 4

The device for measuring the activity of silver ions is prepared in a manner similar to that of Example 1. A disc of Example 4 includes 30 wt. percent of silver selenide and 70 wt. percent of silver telluride as the starting materials. The preparation of the disc is similar to that of Example 1. The potential between the selective electrode and a saturated calomel electrode in an aqueous solution of silver nitrate is measured with the same procedure described in Example 1. The device measures the activity of silver ions with a high sensitivity as shown in Table 4.

TABLE 4

| Activity of silver ions, M: | Potential, mv. |
|---|---|
| $10^{-1}$ | −31 |
| $10^{-2}$ | −87 |
| $10^{-3}$ | −145 |
| $10^{-4}$ | −203 |
| $10^{-5}$ | −262 |
| $10^{-6}$ | −321 |
| $10^{-7}$ | −380 |
| $10^{-8}$ | −435 |
| $10^{-9}$ | −466 |

Example 5

A device for measuring the activity of silver ions is prepared in a manner similar to that of Example 1. A disc of Example 5 includes 20 wt. percent of silver sulfide, 20 wt. percent of silver selenide and 60 wt. percent of silver telluride as the starting materials. The preparation of the disc is similar to that of Example 1. The potential between the selective electrode and a saturated calomel electrode in an aqueous solution of silver nitrate is measured. The device measures the activity of silver ions with a high sensitivity and a high response as shown in Table 5.

TABLE 5

| Activity of silver ions, M | Potential, mv. | Response time, sec. |
|---|---|---|
| $10^{-1}$ | −42 | <3 |
| $10^{-2}$ | −95 | <3 |
| $10^{-3}$ | −152 | <3 |
| $10^{-4}$ | −211 | 3 |
| $10^{-5}$ | −270 | 5 |
| $10^{-6}$ | −329 | 15 |
| $10^{-7}$ | −381 | 40 |
| $10^{-8}$ | −426 | 75 |
| $10^{-9}$ | −451 | 155 |

What is claimed is:

1. A device for measuring the activity of silver ions, comprising a selective electrode and a reference electrode which are coupled through a potential measuring apparatus, said selective electrode including a disc which in a batch composition consists essentially of at least one member selected from the group consisting of silver selenide and silver telluride.

2. A device for measuring the activity of silver ions, comprising a selective electrode and a reference electrode which are coupled through a potential measuring apparatus, said selective electrode including a disc which in a batch composition consists essentially of 30 to 99 wt. percent of one member selected from the group consisting of silver selenide and silver telluride and 1 to 70 wt. percent of silver sulfide.

3. A device for measuring the activity of silver ions as defined in claim 1, wherein said batch composition consists essentially of 1 to 99 wt. percent of silver telluride and 1 to 99 wt. percent of silver selenide.

4. A device for measuring the activity of silver ions, comprising a selective electrode and a reference electrode which are coupled through a potential measuring apparatus, said selective electrode including a disc which in a batch composition consists essentially of 1 to 30 wt. percent of silver selenide, 30 to 69 wt. percent of silver telluride and the remainder of silver sulfide.

5. A device for measuring the activity of silver ions, comprising a selective electrode and a reference electrode which are coupled through a potential measuring apparatus, said selective electrode including a disc which in a batch composition consists essentially of 10 to 30 wt. percent of silver sulfide and 70 and 90 wt. percent silver telluride.

References Cited

UNITED STATES PATENTS 3,591,464   7/1971   Frant et al. _____ 204—1 T
3,669,862   6/1972   Hirata et al. _____ 204—195 M TA-HSUNG TUNG, Primary Examiner U.S. Cl. X.R.

204—1 T